United States Patent [19]
Huang et al.

[11] Patent Number: 5,267,246
[45] Date of Patent: Nov. 30, 1993

[54] APPARATUS AND METHOD FOR SIMULTANEOUSLY PRESENTING ERROR INTERRUPT AND ERROR DATA TO A SUPPORT PROCESSOR

[75] Inventors: Kevin C. Huang, Endicott; John G. Santoni, Vestal; Gregory S. Still, Endwell, all of N.Y.

[73] Assignee: International Business Machines Corporation, Armonk, N.Y.

[21] Appl. No.: 213,560

[22] Filed: Jun. 30, 1988

[51] Int. Cl.⁵ .............................................. G06F 11/30
[52] U.S. Cl. ...................................... 371/16.5; 371/18; 395/575
[58] Field of Search .................. 371/15, 7, 16, 12, 18, 371/13, 16.5; 370/13; 340/825.16

[56] References Cited

U.S. PATENT DOCUMENTS

| | | | |
|---|---|---|---|
| 3,930,146 | 12/1975 | Bogacz | 371/16 |
| 4,549,256 | 10/1985 | Castel et al. | 371/16 |
| 4,627,054 | 12/1986 | Cooper et al. | 371/11 |
| 4,701,845 | 10/1987 | Andreason et al. | 364/200 |
| 4,868,818 | 9/1989 | Madan et al. | 371/11.3 |

OTHER PUBLICATIONS

Slater, M., *Microprocessor-Based Design*, 1987, Mayfield pub., pp. 124–126, 441–449.
Goolsbey, M. et al., "Machine Check Processing by Vectors", *IBM Technical Disclosure Bulletin*, vol. 23, No. 6, Nov. 1980, pp. 2472–2479.
*IBM Tech. Disclosure Bull.*, vol. 20, No. 3, Draper et al., "Program Service Underrun Detection", Aug. 1977, pp. 1144–1145.
*IBM Tech. Disclosure Bull.*, vol. 20, No. 4, Oliver et al., "Support Processor Error Recovery", Sep. 1977, pp. 1362–1365.
*IBM Tech. Disclosure Bull.*, vol. 22, No. 2, Dodge, "Channel Adapter", Jul. 1979, pp. 753–754.
*IBM Tech. Disclosure Bull.*, vol. 25, No. 10, Bhansali et al., "Recovery Mechanism for . . . Communications Between a Data Processor and an I/O . . . ", Mar. 1983, pp. 5226–5229.
*IBM Tech. Disclosure Bull.*, vol. 27, No. 2, Castel, "Communication Scanner Error Reporting", Jul. 1984, pp. 1154–1155.
*Communications of the ACM*, vol. 28, No. 1, Seitz, "The Cosmic Cube", Jan. 1985, pp. 22–33.
*Proc. Int'l. Conf. on Parallel Processing*, 1985, Tuazon et al., "Caltech/JPL Mark II Hypercube Concurrent Processor", pp. 666–673.
*Computer Design*, Falk, "Computing Speeds Soar with Parallel Processing", Jun. 15, 1988, pp. 49–58.

*Primary Examiner*—Stephen M. Baker
*Attorney, Agent, or Firm*—Pollock, Vande Sande & Priddy

[57] ABSTRACT

Apparatus and method for collecting and analyzing machine check interrupts generated by a central processor complex. Each logic card is scanned to detect the presence of error data generated by logic circuits on the card. A primary maintenance interface card collects the interrupt information identifying the interrupt as to type of interrupt and location of the card generating the interrupt. A system support adapter reports the collected interrupt information over a LAN to a support processor which may thereafter initiate diagnostic operations with the central processor complex.

10 Claims, 4 Drawing Sheets

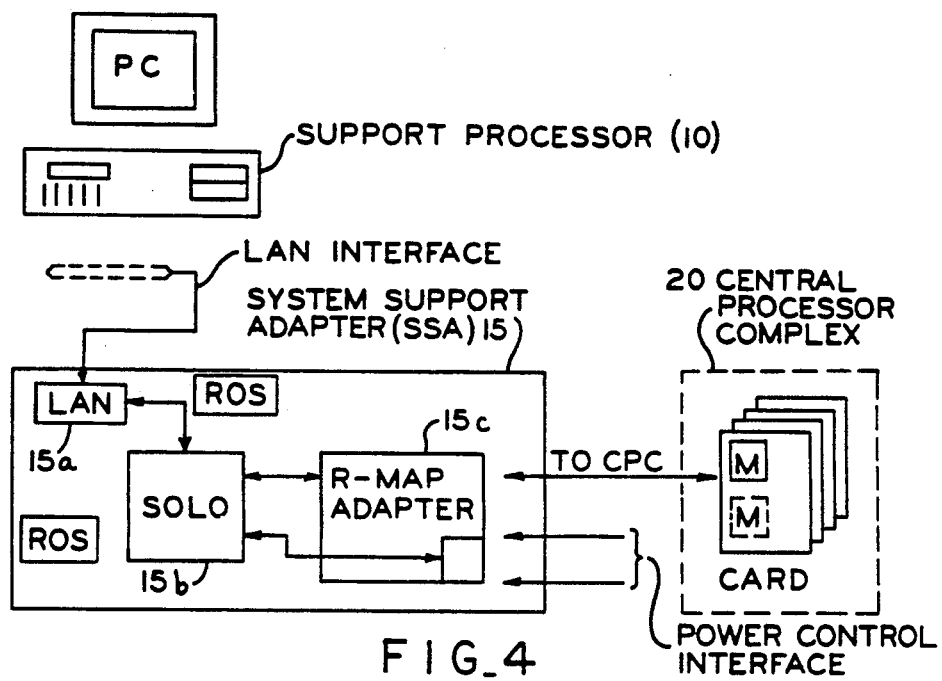
FIG_4
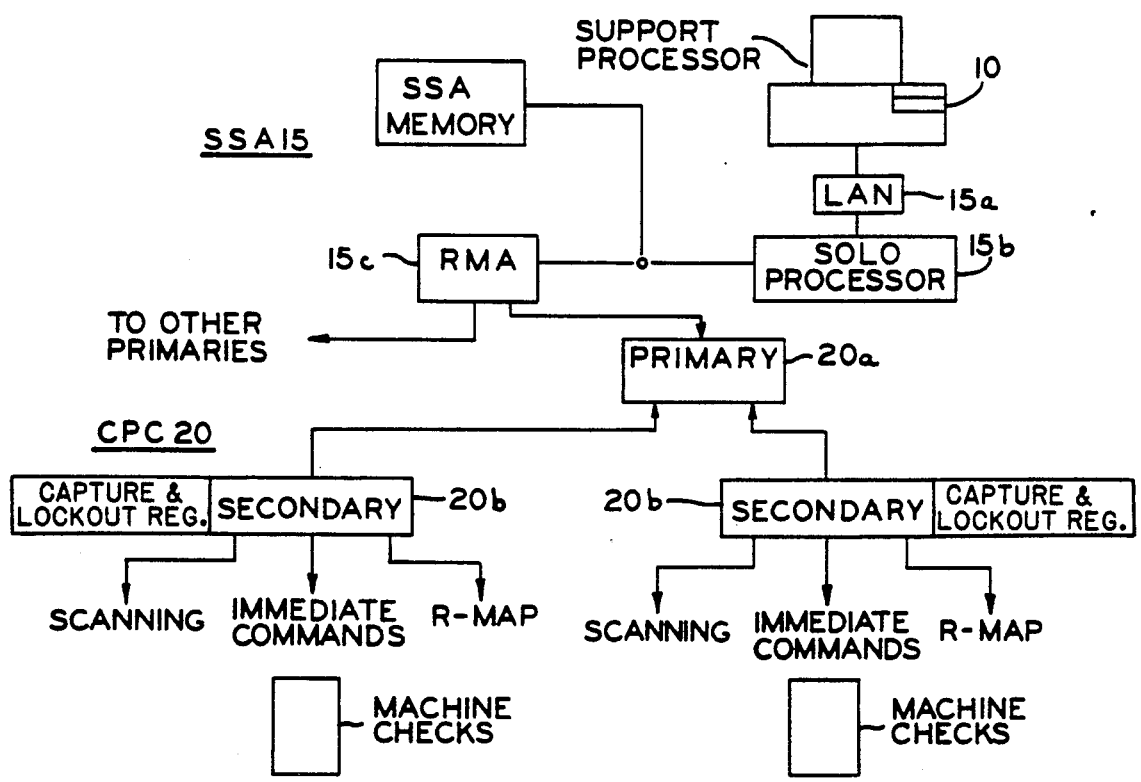
FIG_5

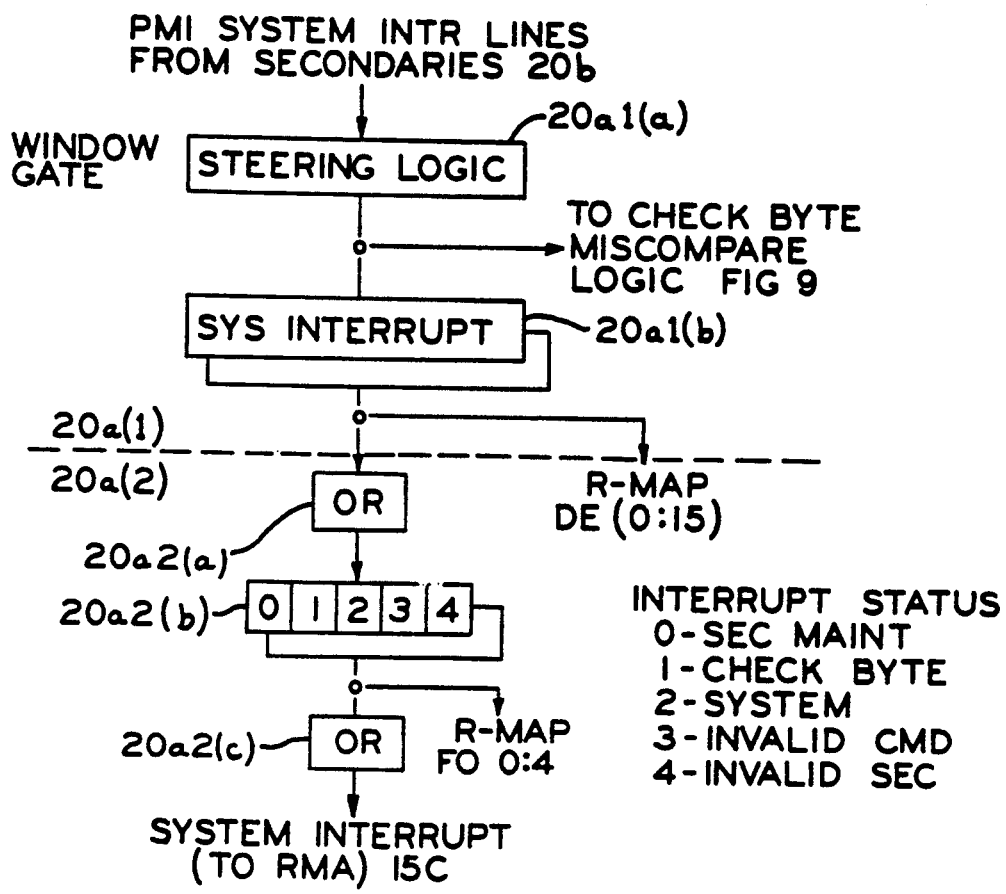
FIG_6
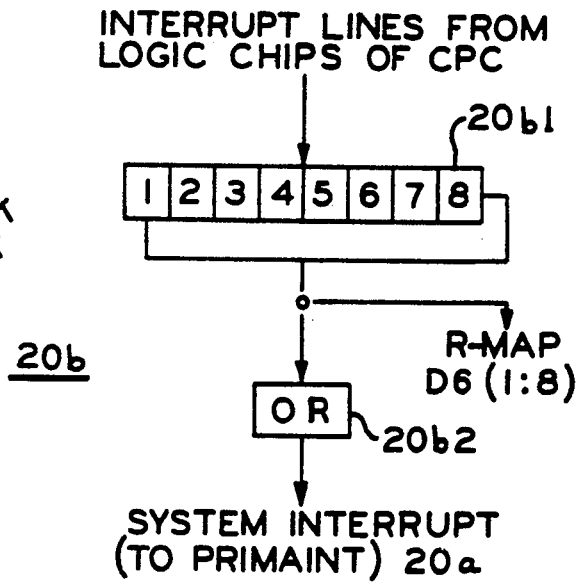
FIG_7

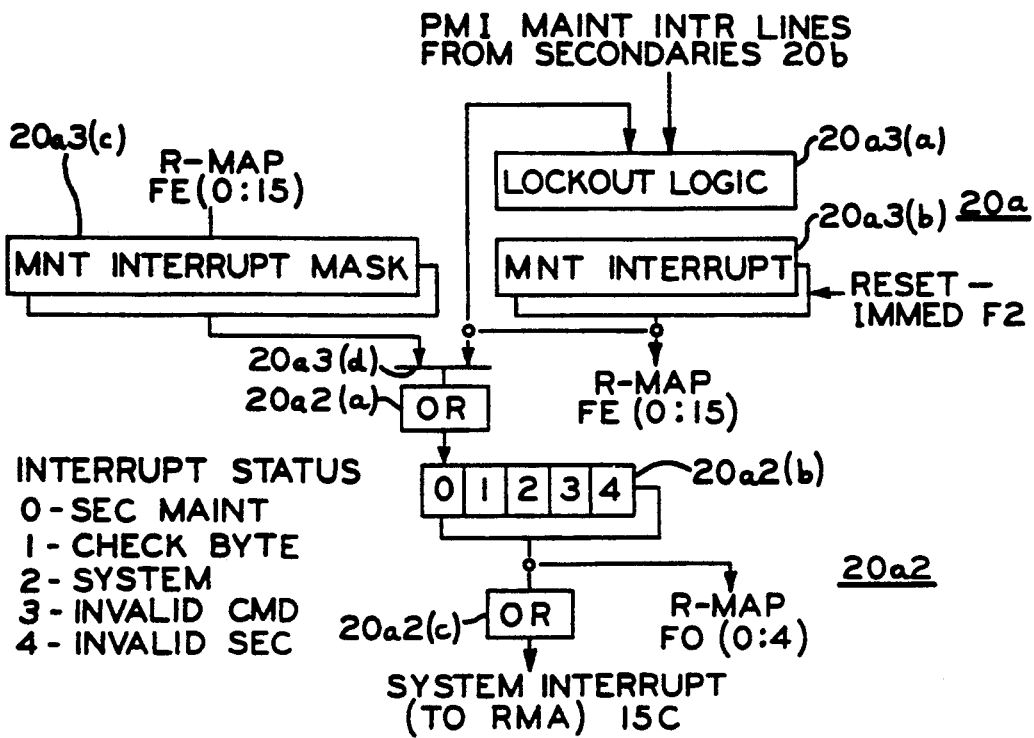
FIG_8
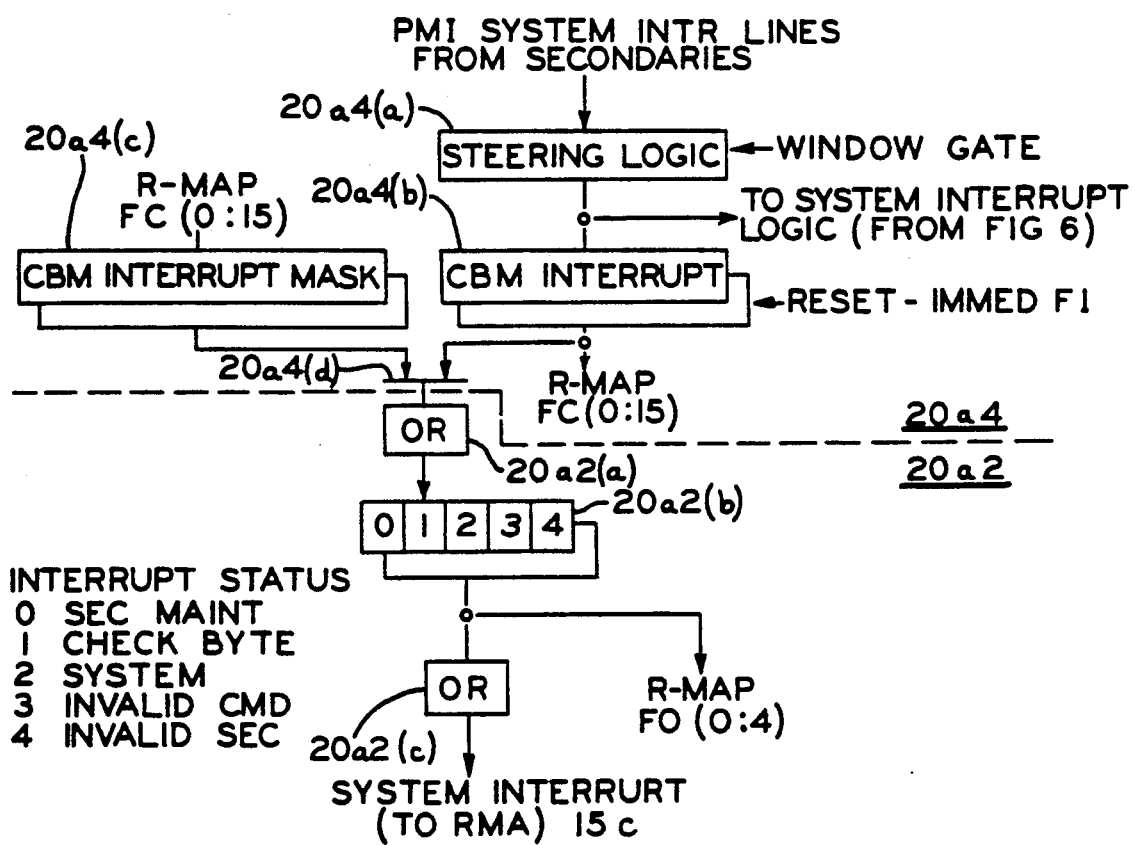
FIG_9

APPARATUS AND METHOD FOR SIMULTANEOUSLY PRESENTING ERROR INTERRUPT AND ERROR DATA TO A SUPPORT PROCESSOR

TECHNICAL FIELD

The subject matter of this invention pertains to computing systems, and more particularly, to an apparatus in the computing system for simultaneously presenting an error interrupt signal and error data to a support processor.

Computing systems very often include a processor and a support processor connected to the main processor. When a machine check is detected in the processor, an interrupt is presented to the Support Processor (SP) indicating service is required. System clocks to the affected processor (or all processors in a tightly coupled system) must be stopped before the SP can initiate scanning. Scanning allows the SP to gather data necessary to determine the source of the machine check and possibly the extent of damage caused by the check. Each scan ring in the system is scanned out of the Central Processor Complex (CPC) by the SP. The scanned data bits are translated into a structured form readily accessible by the SP microcode in order to determine the machine check(s) active in the system. After the machine check status has been determined, retry procedures can be initiated.

There are several deficiencies associated with the process of scanning and translating data bits to determine the source of the machine check. First, because the source of the check is not known at the time the interrupt is received by the SP, all processors represented by the interrupt must be stopped in preparation for scanning The effect of this may be to add to system damage and decrease overall system availability since a functional processor may be running in an unretriable state at the time it is stopped. If this occurs, an Initial Microcode Load (IML) will be required to restart the system. Second, scanning is very time consuming as it is a serial operation requiring each scan ring on each chip to be addressed sequentially and usually at a much slower speed than those at which the CPC operates. Additional delays of significance are encountered as the SP performs the translation of the scanned data bits to determine both the machine check source and the associated error information. These delays result in extended down time and may result in the disconnection of Input/Output devices. Finally, in the case of multiple active machine checks, it cannot always be determined which machine check occurred first. Additional machine parts may have to be replaced due to this inefficiency in error isolation. If the source of the machine check and extent of damage can be made available to the SP simultaneously with the initial machine check interrupt, the time required to service the interrupt could be significantly reduced because the SP is no longer required to determine this information. In a multiprocessor environment, there would be the added benefit of increased system availability because the source of the problem has been isolated for the SP, allowing other independent processors to continue running while the SP services only the affected areas.

SUMMARY OF THE INVENTION

Accordingly, it is an object of the present invention to simultaneously present the initial machine check interrupt, the source of the machine check and the extent of damage to a support processor of a computer system.

It is a further object of the present invention to interpose a system support adapter (SSA) between the service processor and the main processor which functions to interrogate the main processor for the source of a machine check and the extent of damage, in the main processor, caused by the machine check when the initial machine check interrupt is first received by the SSA, the SSA simultaneously presenting information to the SP relating to the machine check interrupt, the source of the machine check and the extent of damage caused by the machine check when all such information has been collected by the SSA from the main processor.

These and other objects of the present invention are accomplished by interposing a system support adapter (SSA) between the support processor (SP) and the central processor complex (CPC) of a main processor. The SSA intercepts a machine check signal, originating from the CPC and en route to a SP, and collects all error data critical to isolating the machine check and resultant damage prior to simultaneously presenting the machine check signal and error data to the SP. A machine check data collection mechanism is located on the CPC of the main processor, the collection mechanism initiating a series of microcode driven Rapid Maintenance Access Path (RMAP) commands which source predefined register locations on every logic card in the CPC. System clocks need not be stopped on any logic card during the collection of data because the RMAP commands execute on independent and unique maintenance clocks only. The maintenance clocks operate at CPC clock speeds. The error data collected describes the origin of the machine check, the level of the machine check (indicating the pervasiveness of the check) and the type of machine check (e.g., system machine check versus maintenance type check). After error data is collected by the SSA and stored in a memory buffer area of the SSA, a machine check interrupt will be presented to the SP by the SSA simultaneous with the presentation of the critical error information to the SP by the SSA. The SP can, in turn, provide the necessary servicing in a more expedient manner while limiting the amount of interruption within the system, thus minimizing the down time and enhancing overall system availability.

Further scope of applicability of the present invention will become apparent from the detailed description presented hereinafter. It should be understood, however, that the detailed description and the specific examples, while representing a preferred embodiment of the invention, are given by way of illustration only, since various changes and modifications within the spirit and scope of the invention will become obvious to one skilled in the art from a reading of the following detailed description.

BRIEF DESCRIPTION OF THE DRAWINGS

A full understanding of the present invention will be obtained from the detailed description of the preferred embodiment presented hereinbelow, and the accompanying drawings, which are given by way of illustration only and are not intended to be limitative of the present invention, and wherein:

FIG. 4 illustrates a more detailed diagram of the SSA card of FIG. 3 connected to the support processor (SP) and the Central Processor Complex (CPC) of FIG. 3;

FIG. 5 illustrates a maintenance support subsystem (MSS), in accordance with the present invention, including a more detailed diagram of the CPC of FIGS. 2-4 connected to the more detailed diagram of the SSA card of FIG. 4;

FIG. 6 illustrates an embodiment of a portion of the Primary Maintenance (PRIMAINT) Interface (PRIMARY) of FIG. 5, this portion representing the primary system interrupt collection;

FIG. 7 illustrates an embodiment of a portion of the Secondary Maintenance (SECMAINT) Interface (SECONDARY) of FIG. 5, this portion representing the secondary system interrupt collection;

FIG. 8 illustrates an embodiment of a further portion of the PRIMARY of FIG. 5, this portion representing the primary maintenance interrupt collection; and FIG. 9 illustrates an embodiment of a still further portion of the PRIMARY of FIG. 5, this portion representing the primary check byte miscompare interrupt collection.

DESCRIPTION OF THE PREFERRED EMBODIMENT(S)

Figure 1:
FIG. 1 illustrates a sketch of an error interrupt and error data collection system of the prior art.

Referring to FIG. 1, a sketch of a prior art error interrupt and error data collection system is illustrated. In FIG. 1, a support processor (SP) 10 is connected directly to a central processor complex (CPC) 20 via a bus, called a QBUS. In operation, when a machine check occurs in the CPC 20, the CPC 20 sends an interrupt signal, indicative of an error in the CPC, to the SP 10. The SP 10 is interrupted in its operation. The SP 10 interrogates the CPC 20, reading the cause of the interrupt and reading the error data from the CPC 20. The SP 10 then uses the interrupt and error data to correct the error. Time was expended in reading the cause of the interrupt and reading the error data from the CPC 20, once the interrupt signal was received by the SP 10.

Figure 2:
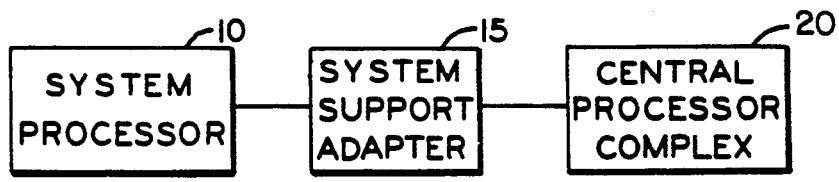
FIG. 2 illustrates a sketch of an error interrupt and error data collection system of the present invention.

Referring to FIG. 2, a sketch of the error interrupt and error data collection system of the present invention is illustrated. In FIG. 2, the SP 10 is connected to the CPC 20, via a system support adapter (SSA) 15. In operation, a machine check occurs in the CPC, indicative of an error condition in the main processor or CPC 20. The SSA 15 is interrupted. The SSA 15 reads the cause of the interrupt and the data associated with the interrupt (error data) from the CPC 20. The SSA 15 sends the initial interrupt signal, the cause of the interrupt, and the error data, simultaneously, to the SP 10. The SP 10 may immediately begins correction of the error. Time is not spent by the SP 10 in reading error data.

Figure 3:
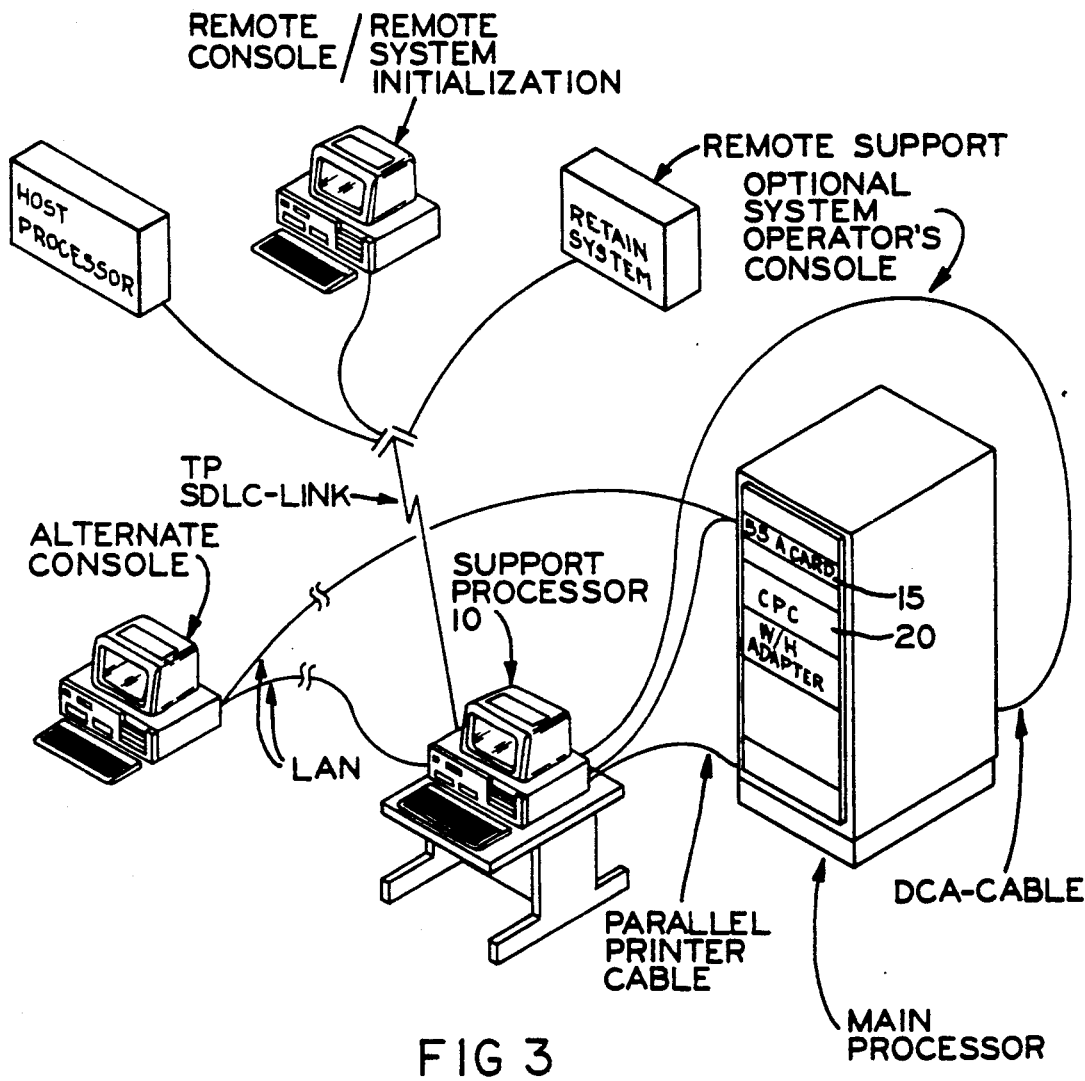
FIG. 3 illustrates a three-dimensional sketch of the error interrupt and error data collection system of FIG. 2.

FIG. 3 illustrates a three-dimensional view of the support processor (SP) 10 connected to the CPC 20 of a main processor via the SSA card 15 of FIG. 2. The SP 10 is a personal computer. The SSA 15 is a card housed within a rack of the main processor. The CPC 20 is comprised of other cards housed within the rack of the main processor.

FIG. 4 illustrates a further, more detailed construction of the SSA card 15, interconnected between the SP 10 and the CPC 20. The SSA card 15 provides the means by which a remote PC support processor 10 can be attached to the CPC 20 of a main processor and intelligently distribute data to multiple bus architectures within the processor complex. The SSA 15 is a dynamically programmable, stand alone, device that contains a bootstrap read only storage (ROS) by which it requests an initial program load from an externally attached SP 10 through an local area network (LAN) interface. The SSA 15 is comprised of three logical components: (1) the LAN interface 15a, (2) a SOLO Microprocessor 15b with a 512K Random Access Memory (RAM) including parity and error correction (ECC), and (3) a Rapid Maintenance Access (RMA) adapter logic module 15c.

The LAN interface 15a is controlled by an on-card ROS that controls the LAN logic module so that it will respond electrically to a Token Ring LAN architecture. This LAN 15a module also has provision for responding with a LAN address that is unique to each SSA card. This feature allows any number up to 256 SSA cards to be linked on a single LAN net. This feature allows clusters of processors to be serviced by a single SP 10 which is programmed to act as a support processor for the cluster. In addition, back-up personal computers can be attached to the LAN net to provide high availability should a single PC fail.

The SOLO Microprocessor 15b is a microprocessor controller for this SSA card 15. This microprocessor has 512K of RAM and can be dynamically loaded with a control program via the external SP 10. This dynamic load allows the card functions to be tailored or modified to meet the needs of the host/main processor The main function of this SOLO processor 15b is to receive/send data to the LAN interface 15a and to receive/send data to the RMA module 15c. In addition, the SOLO 15b can make independent decisions or manipulate this data in any desired manner, by use of its control program.

The Rapid Maintenance Adapter (RMA) module 15c is the primary interface between the SSA 15 and the CPC 20 of the host/main processor. This adapter 15c provides the logical means to control the movement of data between the SSA card 15 and any of three unique maintenance busses within the host processor. These three maintenance busses are the R-MAP interface bus, the scan interface bus, and a special power control bus. The RMA module 15c provides the means to interface all three of these maintenance busses within the host/main processor to the RAM of the SOLO microprocessor 15b.

In FIG. 4, note that the CPC 20 comprises a plurality of cards, each card having a plurality of modules disposed thereon.

Referring to FIG. 5, the Maintenance Support Subsystem (MSS), in accordance with the present invention, is illustrated.

In FIG. 5, the MSS comprises the SSA 15 of FIG. 4 interconnected between the support processor (SP) 10 and the CPC 20. The SP 10 is a personal computer which is connected to a main processor via a local area network (LAN) connection The LAN requires a form of processing at each station on the network to interpret the communication protocols. This is handled on the rack side of the link by a SOLO microprocessor 15b housed in the SSA 15 card. The SOLO functions to accept the LAN connection and transfer the requested operations to a series of memory mapped buffers contained in the RMA module (R-MAP adapter) 15c. The RMA 15c allows the CPC 20 to access these buffers in the RMA 15c through an interface known as the Enhanced Parallel Maintenance Interfaces (EPMI), so that the required function can be physically accomplished. The CPC 20 comprises a Primary Maintenance (PRIMAINT) interface 20a and a Secondary Maintenance (SECMAINT) interface 20b. The PRIMAINT interface 20a is logically divided into two parts, a primary unit and a secondary master image unit (not shown in the drawings). The primary unit acts as a mover interface for data passing between the RMA 15c and the SECMAINT interface 20b. The secondary master image unit handles the logic on the clock-maintenance cards where the primary unit is resident and also serves as a secondary against which all other secondaries, on the SECMAINT interface 20b, are compared to verify that the operations occur properly. The Secondary Maintenance (SECMAINT) interface 20b actually performs the operation being requested by the SP 10. The SECMAINT interface 20b chips are typically present on every card in the CPC 20 and provide the interface to each of the logic chips in the CPC 20. This allows scanning of the logic chips to take place. In FIG. 5, the PRIMAINT interface 20a is connected to the RMA 15c of the SSA 15 via the Enhanced Parallel Maintenance Interface (EPMI). The PRIMAINT interface 20a is connected to the SECMAINT interface 20b of each card of the CPC 20 (as illustrated in FIG. 4), the SECMAINT interface 20b interfacing with each logic chip on each card of the CPC 20.

Referring to FIG. 6, a further construction of the PRIMAINT interface 20a of FIG. 5 is illustrated.

In FIG. 6, the PRIMAINT interface 20a comprises a first logic portion 20a1 and a second logic portion 20a2. The first logic portion 20a1 includes a steering logic 20a1(a) which receives the Primary Maintenance Interface (PMI) SYSTEM INTR lines from the SECMAINT interface 20b and which is connected to a SYS Interrupt register 20a1(b). The SYS Interrupt register 20a1(b) is sourced by an R-MAP DE(0:15) command, executing within the SOLO Microprocessor 15b of the SSA 15. The SYS Interrupt register 20a1(b) is connected to an OR gate 20a2(a) of the second logic portion 20a2. The second logic portion 20a2 comprises the OR gate 20a2(a) connected to a position of the Interrupt Status register 20a2(b) of the second logic portion 20a2, the status register 20a2(b) being sourced by an R-MAP FO(0:4) command executing within the SOLO Microprocessor 15b of the SSA 15. The status register 20a2(b) is connected to an OR gate 20a2(c) of the second logic portion 20a2, this OR gate generating a SYSTEM INTERRUPT signal which energizes the RMA 15c of the SSA 15. The interrupt status register 20a2(b) is capable of holding 5 bits, each bit representing a specific type of interrupt status. Each type is listed in FIG. 6 adjacent the interrupt status register 20a2(b).

Referring to FIG. 7, a further construction of the SECMAINT interface 20b of FIG. 5 is illustrated. The SECMAINT interface 20b comprises an interrupt type register 20b1, which receives the interrupt lines from the logic chips on each card of the CPC 20. The interrupt type register 20b1 is sourced by an R-MAP D6(1:8) command executing within the SOLO Microprocessor 15b of the SSA 15. The Interrupt type Register 20b1 is connected to an OR gate 20b2, the OR gate 20b2 generating the system interrupt signal which energizes the PRIMAINT interface 20a. The interrupt type register 20b1 is capable of holding 8 bits, each bit representing a specific type of interrupt. The interrupt types are listed in FIG. 7 adjacent the interrupt register 20b1.

A functional description of the Maintenance Support Subsystem (MSS) of the present invention will be set forth in the following paragraphs with particular reference to FIGS. 5-7, and with the assistance of FIG. 1-4.

A system support adapter (SSA) 15 is interposed between the support processor (SP) 10 and the central processor complex (CPC) 20 of a main processor. The SSA 15 intercepts a machine check signal, originating from the CPC 20 and en route to a SP 10. In response, the SSA 15 interrogates the CPC 20, collecting all error data critical to isolating the machine check and resultant damage prior to simultaneously presenting the machine check signal and error data to the SP 10. A machine check error data collection mechanism (see FIG. 5) is located on the CPC 20 of the main processor, the collection mechanism initiating a series of microcode driven Rapid Maintenance Access Path (RMAP) commands which source predefined register locations on every logic card in the CPC. The contents of these registers are transmitted to the SSA 15. System clocks need not be stopped on any logic card during the collection of data because the RMAP commands execute on independent and unique maintenance clocks only. The maintenance clocks operate at CPC clock speeds. The error data collected from the predefined register locations describe the origin of the machine check, the level of the machine check (indicating the pervasiveness of the check) and the type of machine check (e.g., system machine check versus maintenance type check). After error data is collected by the SSA 15 and stored in a memory buffer area of the SSA 15, a machine check interrupt will be presented to the SP 10 by the SSA 15 simultaneous with the presentation of the critical error information to the SP 10 by the SSA 15. The SP 10 can, in turn, provide the necessary servicing in a more expedient manner while limiting the amount of interruption within the system, thus minimizing the down time and enhancing overall system availability.

In FIG. 5, each of the SECMAINT interfaces 20b reside on a card in the CPC 20. When a particular SECMAINT 20b, hereinafter termed "secondary", intercepts a machine check interrupt from its associated card, it sets the PMI SYSTEM INTR line to the PRIMAINT interface 20a, hereinafter termed "primary", active. Thus, the PMI SYSTEM INTR line input to the steering logic 20a1(a) of FIG. 6 is active. As a result, the SYS Interrupt register 20a1(b) in the primary 20a of FIG. 6 is set, and the SYS Interrupt Status Latch 20a2(b), in the primary 20a of FIG. 6, is set. Therefore, the System Interrupt line, output from OR gate 20a2(c) in the primary 20a of FIG. 6, to the RMA 15c of the SSA 15 is set active. In response, in FIG. 5, the RMA 15c interrupts the SOLO microprocessor 15b, which results in a breakout of the Interrupt Handler Code resident in the SSA Memory Random Access Memory (RAM). The Interrupt Handler Code comprises a series of RMAP Read commands, designed to collect error/machine data from each of the secondaries, resident on each card of the CPC 20 of the main processor. The SOLO Microprocessor 15b executes the RMAP Read commands associated with the Interrupt Handler Code, thereby collecting error/machine data from the secondaries. The error/machine data is collected by the SSA 15 from each of the secondaries on each card of the CPC 20, which indicated a machine check, in the following manner:

(1) In FIG. 6, Read Command F0(0:4), being executed by the SOLO Microprocessor 15b of the SSA 15, sources the contents of the Interrupt Status register 20a2(b) of the primary 20a of FIG. 6. This command captures the type of interrupt occurring within the CPC 20.

(2) In FIG. 6, Read Command DE(0:15), being executed by the SOLO Microprocessor 15b, sources the SYS Interrupt register 20a1(b) of the primary 20a of FIG. 6. This command captures the origin of the interrupt intercepted from a secondary.

(3) In FIG. 7, Read Command D6(1:8), being executed by the SOLO Microprocessor 15b, sources the Interrupt Type Register 20b1 of each of the secondaries 20b of FIG. 7 indicated by the SYS Interrupt register 20a(1)b, on each logic card of the CPC 20, capturing the level of the machine check interrupt, the level indicating the clock action taken within a predefined Field Replaceable Unit (FRU) boundary, the clock action being designed as part of the retry philosophy.

(4) Read Command 00-0F, not shown in the drawings, being executed by the SOLO Microprocessor 15b of the SSA 15, sources certain capture and lockout registers as well as machine check latches in the secondaries of each logic card thereby capturing all machine checks occurring on the logic cards as well as determining the first machine check occurring (for defect isolation). This is performed for each secondary which indicated that a machine check occurred.

(5) In FIG. 7, It is possible for the SOLO Microprocessor to execute Read Command 0A-0F for each primary 20a which indicated that a machine check existed. The results of execution of this read command indicates which of the secondary's have captured a machine check, as well as the first secondary to indicate a machine check (for additional defect isolation). For interrupt type 1 checks (see FIG. 7 which indicates that an interrupt type 1 check is a level ½ Machine Check), it is possible to completely scan each Secondary on each card of the CPC 20, which indicated a machine check, to obtain detailed information concerning the check.

After the initial machine check interrupt is received by the SOLO Microprocessor 15b of the SSA 15, and all the error/machine data has been collected by the SOLO 15b, in accordance with the above referenced procedures, the initial machine check interrupt and all the error/machine data collected by the SOLO 15b will be transmitted from the SSA 15 to the support processor (SP) simultaneously, for analysis, recovery, and logging. When the retry microcode is invoked by the SP, not only is it apparent that a machine check occurred, but there also exists sufficient amounts of information about the machine check to perform initial analysis and recovery procedures. In some cases, there is enough information available to completely analyze the check without the need to additionally source the CPC 20. This is very important for the purpose of reducing service times per machine check occurrence. Simultaneous transmission of the machine check interrupt with the related machine check data to the SP reduces the time necessary to process and recover from the machine check. In the prior art, machine check information could only be determined through the lengthy process of scanning and comparing latch values in the SP at the expense of processor down time. The data sent to the SP along with the machine check interrupt indicates the number, location, level(type), and sequence of the machine checks. From this information, the retry microcode in the SP can analyze the machine check and determine if scanning for further data is necessary and possible. For interrupt type 1 machine checks (see FIG. 7), if scan data for the secondary was also sent with the machine check interrupt, no further scanning would be necessary by the retry microcode. After the retry microcode analyzes the data, it determines the resets and/or reconfigurations necessary to send to the CPC to recover from the machine check. It then restarts the processor, if possible. Finally, the machine check data is logged for future reference and analysis. Since the SP is presented with both the initial interrupt signal and error/machine data, simultaneously, the SP can limit the amount of system level interference as the problem area can be addressed in an isolated manner. In a multiprocessor configuration, this results in an increase in system availability.

Referring to FIG. 8, the primary 20a maintenance interrupt collection is illustrated.

In FIG. 8, the maintenance interrupt collection comprises the same second logic portion 20a2 as shown in FIG. 6, but it is connected to a third logic portion 20a3. The third logic portion 20a3 comprises lockout logic 20a3(a) connected to the PMI MAINT INTR (primary maintenance interrupt) lines from the secondaries 20b located on each of the cards of the CPC 20. The lockout logic 20a3(a) is connected to a MNT Interrupt register 20a3(b), which is sourced by an RMAP FE(0:15) read command executing in the SOLO Microprocessor 15b. Each bit of the MNT Interrupt register 20a3(b) is connected with a like bit of the MNT Interrupt Mask register 20a3(c), in an AND gate 20a3(d), and the AND gate 20a3(d) outputs are connected to an input of the OR gate 20a2(a) of the second logic portion 20a2. The third logic portion 20a3 comprises the MNT Interrupt Mask register 20a3(c) connected to the OR gate 20a2(a). As usual, the OR gate 20a2(c) of the second logic portion, as shown in FIG. 6 as well as FIG. 8, generates the System Interrupt line to the RMA 15c of SSA 15.

A functional description of the operation of the maintenance interrupt collection of FIG. 8 will be set forth in the following paragraphs.

There are five types of interrupts communicated to the RMA 15c of the SSA 15: (1) secondary maintenance interrupt, (2) check byte miscompare interrupt, (3) secondary system interrupt, (4) invalid command interrupt, and (5) invalid secondary interrupt. The initial system interrupt signal, associated with any of the above mentioned interrupts, is detected at the primary 20a level by reading the contents of the Interrupt Status Register 20a2(b) of the second logic portion 20a2 in primary 20a, via the read command R-MAP F0(0:4), as shown in FIG. 8. These interrupts, their associated hardware, and the steps necessary to service them are described in the following paragraphs.

When a problem occurs with the communications signals between the primary 20a and the secondary 20b, or a data parity problem exists on a chip monitored by a particular secondary 20b, that particular secondary 20b sets its PMI MAINT INTR line to the associated primary 20a indicating the occurrence of an interrupt. This, in turn, sets, in the associated primary 20a, as shown in FIG. 8, a maintenance interrupt register bit, in MNT Interrupt register 20a3(b), and sets the MNT interrupt status latch 20a2(b). This causes the primary 20a of FIG. 8 to set the System Interrupt line to the RMA 15c of SSA 15. When the System Interrupt line to RMA 15c is set, the contents of the Interrupt Status latch 20a2(b) of the second logic portion 20a2 is read by the SOLO Microprocessor 15b via RMA 15c, in accordance with a Read Command R-MAP FO(0:4) executing in the SOLO microprocessor 15b, in order to determine the type of interrupt which occurred. If the interrupt, communicated to the RMA 15c, is the type termed the "secondary maintenance interrupt", a maintenance interrupt bit, bit 0, in the Interrupt Status latch 20a2(b), is set. The identity of the particular offending secondary 20b may be determined (there may be more than one) by reading the MNT Interrupt register 20a3(b) via a Read Command R-MAP FE (0:15) executing in the SOLO microprocessor of SSA 15. A "1" in any bit position of the MNT Interrupt register 20a3(b) indicates position in the register 20a3(b) where the "1" is located, had an error. There may be more than one secondary having an error; therefore, there may be more than one "1" bit stored in various bit positions of the MNT Interrupt register 20a3(b). If more than one secondary 20b had an error, each must be serviced separately. Next, the interrupt from the offending secondary must be disabled, causing the Enhanced Parallel Maintenance Interface (EPMI) System Interrupt line, between the primary 20a and the RMA 15c of the SSA 15, to drop, allowing other system interrupts to be detected. To disable the interrupt from the offending secondary, the contents of the MNT Interrupt Mask 20a3(c) of FIG. 8 is written by the SOLO Microprocessor 15b in accordance with the Write Command R-MAP FE(0:15) executing in the SOLO Microprocessor 15b. A "disable Maintenance Interrupts" command (IMM FE) is issued by the microprocessor 15b; as a result, a "1" is over-written in the bit positions within the Interrupt Register 20a3(c), responding to the offending secondaries (as indicated by the "1" bit in the MNT Mask register 20a3(c)), where the interrupt must be disabled (other bit positions remain "0"). Having disabled the interrupt from the offending secondary(s) 20b, the microprocessor 15b may now interrogate the offending secondary by scanning the secondary. The received error data is processed by the microprocessor 15b. After determination of the problem, the secondary and its associated interrupt path must be reset. This is done scanning its associated initial microcode load (IML) data in the SP 10, from predetermined tables stored in the SP 10. The MNT Interrupt register 20a3(b) on the primary 20a must be reset. To reset this register, the corresponding MNT Interrupt Mask 20a3(c) must be over-written with a "1" placed in any bit position where the reset is necessary ("0" in other bit positions). The "reset MNT interrupts" (1MM F2) command, executed by the SOLO microprocessor 15b overwrites this "1" in the Interrupt 20a3(c). Finally, the MNT Interrupts must be enabled.

Referring to FIG. 9, the primary 20a check byte miscompare interrupt collection is illustrated. In FIG. 9, the check byte miscompare interrupt collection comprises the same second logic portion 20a2 as shown in FIG. 6, but it is connected to a fourth logic portion 20a4. The fourth logic portion 20a4 comprises steering logic 20a4(a) connected to the PMI SYSTEM INTR (primary maintenance interrupt system interrupt) lines from the secondaries 20b located on each of the cards of the CPC 20. The steering logic 20a4(a) is connected to a CBM (check byte miscompare) interrupt register 20a4(b), which is sourced by an RMAP FC(0:15) read command executing in the SOLO Microprocessor 15b. The CBM Interrupt register 20a4(b) is connected through an AND gate 20a4(d) with an associated bit of an Interrupt Mask 20a4(b) to an input of the OR gate 20a2(a) of the second logic portion 20a2. The third logic portion 20a3 also comprises a CBM Interrupt Mask register 20a4(c) connected to the OR gate 20a2(a). As usual, the OR gate 20a2(c) of the second logic portion, as shown in FIG. 6 as well as FIG. 9, generates the System Interrupt line to the RMA 15c of SSA 15.

A functional description of the operation of the check byte miscompare interrupt collection of FIG. 9 will be set forth in the following paragraphs.

Each of the logic chips in the CPC 20 contain what is termed a scanning ring. After the secondary 20b logic chips are scanned for error data, the secondary 20b performs a compare of the check byte which was first scanned into the scanning ring and the last byte scanned out of the scanning ring. When a miscompare is detected, the secondary 20b uses the PMI SYSTEM INTR line to present the error to the primary 20a by placing the error on the line during a predetermined one cycle window (at all other times, this line presents normal system interrupts). When the primary detects this error, it sets a bit in the check byte miscompare (CBM) register, CBM Interrupt register 20a4(b). Therefore, the CBM Interrupt Status latch 20a2(b) is set, causing the primary to set the "system interrupt" line to the RMA 15c of SSA 15. When the check byte miscompare interrupt line to the RMA 15c (the "system interrupt" line) is set, the interrupt status register 20a2(b) is read, in accordance with the read command R-MAP F(0:4) executing in the SOLO microprocessor 15c of SSA 15, to determine the type of interrupt which occurred. When the check byte miscompare interrupt occurred, a bit in the CBM Interrupt register 20a4(b) was set by the PMI SYSTEM INTR lines from the secondary 20b involved. Therefore, the offending secondary 20b may be identified by reading the CBM Interrupt register 20a4(b). The CBM Interrupt register 20a4(b) is sourced by a read command R-MAP FC(0:15) executing in the SOLO microprocessor 15b of the SSA 15. A "1" in any bit position of the register 20a4(b) indicates that the corresponding secondary 20b, as indicated by the bit position in register 20a4(b), had an error. If more than one secondary had an error, more than one corresponding "1" bit would appear in register 20a4(b); each must be serviced separately. Next, the interrupts from the offending secondaries must be disabled. This will cause the primary system interrupt line to drop (the EPMI line) thereby allowing other interrupts to be detected. To disable the interrupts from the offending secondaries, a "disable CBM interrupts" command (IMM FC) must be issued by the SOLO microprocessor 15b; this over-writes a "1" in the bits positions of the CBM Interrupt mask register 20a4(c) where the disable is necessary, i.e., the bit positions which correspond to the offending secondaries (other bit positions remain a "0"). The SOLO microprocessor 15b may then interrogate the offending secondary 20b using certain diagnostics commands, and may process the received error data accordingly. After the error data is received and processed, the secondary and associated interrupt path must be reset. The secondary is reset by the "reset CBM command" at the secondary level. The CBM Interrupt register 20a4(b), on the primary, must then be reset. To reset this register, the SOLO microprocessor 15b executes the "CBM Interrupts" command which writes a "1" in any location in the CBM Interrupt mask 20a4(c)

where the reset is necessary. This resets the CBM Interrupt register 20a4(b).

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

Having thus described our invention, what we claim as new and desire to secure by Letters Patent is:

1. A method for collecting and analyzing machine check interrupts generated by a central processor complex comprising:

generating for each logic card in said central processor a machine check signal for indicating the presence of error data for a particular card, and generating an interrupt in response thereto;

collecting at a primary maintenance interface each interrupt generated from said logic cards, and storing an indication of each interrupt type received in a system interrupt status register and the origin of said interrupt signals generated in a system interrupt register;

generating a system interrupt in response to receipt of said interrupt at said primary maintenance interface and transmitting said system interrupt to a system support adapter;

generating from a processor in said system support adapted a read command to said primary maintenance interface for reading the contents of said system interrupt status register of said primary maintenance interface to determine the type of interrupt which was generated for each logic card, and for reading said system interrupt register to determine the logic card producing said interrupt; and, reporting to a support processor all of said interrupt data read by said system support adapter.

2. The method of claim 1 further comprising performing initial analysis and sending recovery procedures to said central processor complex from said support processor based on said interrupt data.

3. The method of claim 1 wherein said support processor and system support adapter are connected together by a local area network (LAN).

4. The method for collecting and analyzing machine check interrupts generated by a central processor of claim 1 further comprising:

capturing each interrupt generated in response to said machine check signal in an interrupt type register located on a secondary maintenance interface on a logic card generating said error data; and, registering for each error data generated a corresponding machine check in a capture and lockout register on said logic card.

5. The method of claim 4 further comprising reading data from said interrupt type registers on said secondary maintenance interface on said logic card and from said capture and lock out register with said system support adapter, and transmitting said data to said support processor.

6. The method of claim 4 further comprising identifying the first machine check which is generated by a logic card.

7. A system for collecting error interrupt and error data from a central processor complex comprising:

a secondary maintenance interface associated with each of a plurality of logic cards of said central processor for performing a plurality of scanning operations on each card to verify its operation, storing error data produced from said operations, and generating an interrupt when a data error is produced from said scanning operations;

a primary interface for collecting interrupts generated by said secondary maintenance interface;

a system support adapter including a processor for monitoring when said primary interface receives an interrupt, and for reading data from said secondary maintenance interface, said processor transferring said read data over a local area network; and a support processor connected to said system support adapter through said local area network for receiving and logging said data.

8. The system for collecting error interrupt and error data of claim 7 further comprising:

a system interrupt status latch and system interrupt register at said primary maintenance interface for storing a type of interrupt generated, and the location of a logic card initiating said interrupt.

9. The system of claim 8 wherein said system support adapter reads said interrupt status latch and system interrupt register data contents and transfers said data contents to said support processor.

10. The system of claim 8 further comprising:

an interrupt type register located on said logic card for storing data identifying the type of interrupt generated from said logic card in response to said scanning operations; and a lock out register on said secondary maintenance interface for registering a machine check produced during said machine operations.

* * * * *

UNITED STATES PATENT AND TRADEMARK OFFICE
CERTIFICATE OF CORRECTION

PATENT NO. : 5,267,246
DATED : November 30, 1993
INVENTOR(S) : Huang et al

It is certified that error appears in the above-identified patent and that said Letters Patent is hereby corrected as shown below:

In column 9, line 14, after "indicates" insert --that a particular secondary 20b, identified by the bit--

In column 9, line 33, change "20a3(c), re" to --20a3(b), corre- --.

In column 11, line 31 (claim 1), change "adapted" to --adapter--.

Signed and Sealed this

Twenty-fifth Day of October, 1994

Attest:

BRUCE LEHMAN

Attesting Officer    Commissioner of Patents and Trademarks

UNITED STATES PATENT AND TRADEMARK OFFICE
CERTIFICATE OF CORRECTION

PATENT NO.  : 5,267,246
DATED       : November 30, 1993
INVENTOR(S) : Huang et al It is certified that error appears in the above-identified patent and that said Letters Patent is hereby corrected as shown below:

In column 3, line 57, change "begins" to --begin--.

In column 9, line 14, after "indicates" insert --that a particular secondary 20b, identified by the bit--

In column 9, line 33, change "20a3(c), re" to --20a3(b), corre- --.

In column 11, line 31 (claim 1), change "adapted" to --adapter--.

Signed and Sealed this

Thirteenth Day of December, 1994

BRUCE LEHMAN

Attest:

Attesting Officer

Commissioner of Patents and Trademarks